US007317600B2

(12) United States Patent
Huang et al.

(10) Patent No.: US 7,317,600 B2
(45) Date of Patent: Jan. 8, 2008

(54) CIRCUIT INTERRUPTING DEVICE WITH AUTOMATIC END OF LIFE TEST

(75) Inventors: Huadao Huang, c/o Shanghai Meihao Electric Inc., No. 58, Shahe Road, Jiangqiao Town, Jiading Borough, Shanghai (CN) 201803; Huayang Lu, Shanghai (CN)

(73) Assignee: Huadao Huang, Zhejiang Province (CN)

( * ) Notice: Subject to any disclaimer, the term of this patent is extended or adjusted under 35 U.S.C. 154(b) by 47 days.

(21) Appl. No.: 11/437,811

(22) Filed: May 22, 2006

(65) Prior Publication Data

US 2006/0274463 A1 Dec. 7, 2006

Related U.S. Application Data

(63) Continuation-in-part of application No. 11/362,037, filed on Feb. 27, 2006, now Pat. No. 7,195,500.

(60) Provisional application No. 60/656,090, filed on Feb. 25, 2005.

(51) Int. Cl.
*H02H 2/28* (2006.01)

(52) U.S. Cl. .......................................... 361/42; 335/18

(58) Field of Classification Search .................. 361/42, 361/45; 335/18
See application file for complete search history.

(56) References Cited

U.S. PATENT DOCUMENTS 4,315,328 A * 2/1982 Schwab ....................... 368/66
4,386,338 A 5/1983 Doyle et al.
4,518,945 A 5/1985 Doyle et al.
4,595,894 A 6/1986 Doyle et al.
4,831,496 A 5/1989 Brant et al.
5,202,662 A 4/1993 Bienwald et al.
5,594,398 A 1/1997 Marcou et al.
5,654,857 A 8/1997 Gershen
5,680,287 A 10/1997 Gernhard et al.
5,963,408 A 10/1999 Neiger et al.

(Continued)

*Primary Examiner*—Michael C. Zarroli
(74) *Attorney, Agent, or Firm*—Fei-Fei Chao; Andrews Kurth LLP

(57) ABSTRACT

The present invention provides to a circuit interrupting device, particularly a ground fault circuit interrupter (GFCI), with a test circuit which is capable of automatically generating a simulated leakage current to detect whether the service life of the circuit interrupting device has ended, i.e., whether the main components of the device are working properly, when the device is properly connected to power input terminals and in a tripped state. The test circuit contains an end-of-service-life integrated circuit chip, which is connected to a switch that interacts with the reset button, thereby, by observing whether the device is capable of resetting, a user can determine whether the service life of the device has ended, i.e., if the device can be reset, the device is working properly; if the device cannot be reset, the service life of the device has ended. Optionally, the circuit interrupting device contains an indicating light on the face of the device, thereby, by observing whether a normal status indicating light or a problem status indicating light is turned on and displayed on the face of the device, the user can determine whether the service life of the device has ended. The circuit interrupting device also possesses a forcible tripping mechanism through the operation of the test button to interrupt the power output to the device. The present invention also provides methods for detecting the end of service life of the circuit interrupting device.

26 Claims, 10 Drawing Sheets

U.S. PATENT DOCUMENTS

| | | | | |
|---|---|---|---|---|
| 6,040,967 | A | 3/2000 | DiSalvo | |
| 6,052,265 | A | 4/2000 | Zaretsky et al. | |
| 6,111,733 | A | 8/2000 | Neiger et al. | |
| 6,226,161 | B1 | 5/2001 | Neiger et al. | |
| 6,246,558 | B1 | 6/2001 | DiSalvo et al. | |
| 6,252,407 | B1 | 6/2001 | Gershen | |
| 6,282,070 | B1 | 8/2001 | Ziegler et al. | |
| 6,288,882 | B1 | 9/2001 | DiSalvo et al. | |
| 6,309,248 | B1 | 10/2001 | King | |
| 6,381,112 | B1 | 4/2002 | DiSalvo | |
| 6,437,953 | B2 | 8/2002 | DiSalvo et al. | |
| 6,469,881 | B2 | 10/2002 | Gershen et al. | |
| 6,580,344 | B2 | 6/2003 | Li | |
| 6,671,145 | B2 | 12/2003 | Germain et al. | |
| 6,864,766 | B2 | 3/2005 | DiSalvo et al. | |
| 6,952,150 | B2 | 10/2005 | Radosavljevic et al. | |
| 6,958,895 | B1 * | 10/2005 | Radosavljevic et al. | 361/42 |
| 6,963,260 | B2 | 11/2005 | Germain et al. | |
| 7,019,952 | B2 | 3/2006 | Huang et al. | |
| 7,049,910 | B2 | 5/2006 | Campolo et al. | |
| 7,049,911 | B2 | 5/2006 | Germain et al. | |
| 7,068,481 | B2 | 6/2006 | Radosavljevic et al. | |
| 7,154,718 | B1 | 12/2006 | Finlay, Sr. et al. | |
| 7,212,386 | B1 | 5/2007 | Finlay, Sr. et al. | |

* cited by examiner

CIRCUIT INTERRUPTING DEVICE WITH AUTOMATIC END OF LIFE TEST

RELATED APPLICATION

The present application is a Continuation-In-Part (CIP) of U.S. patent application Ser. No. 11/362,037, filed on Feb. 27, 2006, now U.S. Pat. No. 7,195,500, issued on Mar. 27, 2007, which claims the priority of U.S. Provisional Patent Application Ser. No. 60/656,090, filed on Feb. 25, 2005, which are herein incorporated by reference.

FIELD OF THE INVENTION

The present invention relates to a circuit interrupting device, preferably a ground fault circuit interrupter (GFCI), which contains a test circuit capable of automatically generating a simulated leakage current to detect whether the main components of the device are working properly, when the device is properly connected to power input terminals (i.e., not reversely wired or miswired) and is in a tripped state. The test circuit contains an end-of-service-life integrated circuit chip, which is connected to a switch which becomes conductive when the device is powered properly and is in a tripped state. Thereby, by observing whether the device is capable of being reset, a user can determine whether the service life of the device has ended. Optionally, the circuit interrupting device contains an indicating light. Thereby, by observing whether a normal status indicating light or a problem status indicating light is turned on and displayed on the face of the device, the user can determine whether the service life of the device has ended. The circuit interrupting device also possesses a forcible tripping mechanism through the operation of the test button to interrupt the power output to the device. The present invention also relates to methods for detecting the end of service life of the circuit interrupting device.

BACKGROUND OF THE INVENTION

Circuit interrupting devices, such as ground fault circuit interrupters ("GFCIs") and arc fault circuit interrupters ("AFCIs") have been widely used by consumers since the 1970s. Nowadays, due to household safety concerns, there are needs for GFCIs with extra safety features. According to new UL standards under UL 943, which are scheduled to be in effect starting in July 2006, a GFCI will be required not only to have reverse wiring protection, but also to be able to provide a user with indications to alert the user when the GFCI has reached the end of its service life and is no longer capable of providing ground fault protection. That is because for most of the GFCIs currently available on the market, when their service life ends, resetting by pressing the reset button is still possible, which gives the users a false sense of security that they are still under proper protection of the GFCI, while in fact the GFCI's capability of sensing a ground fault and interrupting the flow of electricity due to a ground fault may have been compromised. Thus, when a ground fault occurs, the GFCI may be unable to provide any protection, which can result in fatal electric shocks.

In the invention to be presented in the following sections, a newly-designed GFCI which is capable of performing an end of life test is provided. The GFCI of the present invention allows the user to automatically detect whether the service life of the device has ended without operating any parts when a source of electricity has been connected. If the GFCI can be reset, the GFCI shows a continuing capability of detecting a ground fault. If the GFCI cannot be reset, it means that the end of the service life of the GFCI has been reached, and that the user should consider replacing the GFCI.

SUMMARY OF THE INVENTION

The present invention provides a circuit interrupting device which comprises a test circuit which can automatically generate a simulated leakage current to test the main components of the circuit interrupting device. If the circuit interrupting device is properly connected to the power source (i.e., not reverse wired or miswired), is in a tripped state, and all of the main components of the circuit interrupting device are working properly, the circuit interrupting device can be reset. If the circuit interrupting device is powered properly and is in a tripped state, but at least one of the main components of the circuit interrupting device is not working properly, such as when one or more of the main components is damaged, shorted or opened, the test circuit does not permit the circuit interrupting device to be reset.

The circuit interrupting device can be a ground fault circuit interrupter ("GFCI"), an arc fault circuit interrupter ("AFCI"), an immersion detection circuit interrupter, an appliance leakage circuit interrupter, or a circuit breaker.

The test circuit comprises an end-of-service-life detecting integrated circuit chip, which can automatically generate a leakage current when the circuit interrupting device is powered and the device is in a tripped state.

The main components of the circuit interrupting device that can be detected by the test circuit include, but are not limited to, a differential transformer (L1), a leakage detection control integrated circuit chip (IC1), an end-of-service-life detecting integrated circuit chip (IC2), optical couplers (IC3, IC4), a silicon control rectifier (SCR), a solenoid coil (SOL), and/or a capacitor.

IC1 is connected to the differential transformer L1. Examples of IC1 include RV4145 from Fairchild Semiconductor International and other commercially available chips such as from National Semiconductor Co. When a fault is detected, the differential transformer sends a signal to IC1, which in turn sends a signal to the SCR to interrupt electrical continuity in the circuit interrupting device.

The end-of-service-life detecting integrated circuit chip (IC2), on the other hand, is connected to a switch (KR1), which is closed and becomes conductive when the reset button (RESET) is in the tripped position, which in turns sends a signal to IC2 to generate a simulated leakage current to test the main components of the circuit interrupting device. If all of the main components in the circuit interrupting device are working properly, IC2 sends a signal which allows the reset button (RESET) to be reset; but when at least one of the main components of the circuit interrupting device is not working properly, no signal is sent by IC2 and the reset button (RESET) cannot be reset. If the reset button (RESET) is in a reset state, the switch is non-conductive, and no signal can be sent to IC2 to generate the simulated leakage current to test the device.

The switch (KR1) comprises a fixed frame and two spring pieces. The two spring pieces are connected to pins 2 and 4 of IC2, respectively. When the switch (KR1) is conductive, and all of the main components in the circuit interrupting device are working properly, the device can be reset, which makes the switch non-conductive. Optionally, IC2 is connected to a normal status indicating light or a problem status indicating light through an optical coupler, respectively. If the device is working properly, the normal status indicating light is turned on. When at least one of the components of the circuit interrupting device is not working properly, the problem status indicating light is turned on. Preferably, the normal status indicating light displays a green light and the problem status indicating light displays a red light or a yellow light.

The circuit interrupting device further comprises a manual test circuit, which generates a simulated leakage current to trip the circuit interrupting device when the test button (TEST) is depressed.

The circuit interrupting device of the present invention can be a ground fault circuit interrupter (GFCI). The GFCI contains (a) a housing; (b) a tripping device positioned in a base of the housing; (c) a circuit board positioned in the base of the housing, which contains (1) a first pair of flexible metal pieces operationally connected to power source input terminals; one end of each of the first pair of flexible metal piece passing through a differential transformer to be operationally connected to a hot input line or a neutral input line; the other end of each of the first pair of flexible metal pieces having a movable contact; (2) a second pair of flexible metal pieces; one end of each of the second pair of flexible metal piece is operationally connected to a hot power output terminal or a neutral power output terminal; the other end of each of the second pair of the flexible metal pieces has a movable contact point; (3) a pair of output conductors positioned in the insulated middle support; each of the output conductors contains a pair of fixed contacts. The movable contact of each of the first pair of flexible metal pieces and the movable contact of each of the second pair of flexible metal pieces are capable of connecting/disconnecting to each of the fixed contacts on the pair of output conductors to form two groups of four pairs of power switches (i.e., KR2-1, KR2-2, KR3-1, KR3-2). Also, each of the pair of the output conductors has a pair of gripping wing pieces protruding through the output socket holes at the front lid of the housing. In addition, each of the movable contacts of the first pair of the flexible metal pieces is in a different cross-sectional plane from each of the movable contacts of the second pair of flexible metal pieces. Furthermore, below each of the first and second pairs of the flexible metal pieces, there is a position limiting piece.

The tripping device comprises a tripper, a locking member, a locking spring, a tripping lever, and a solenoid coil.

The tripper is positioned underneath a reset button (RESET). The tripper has a central through-hole to receive a directional lock which is coupled to the reset button. The directional lock has a blunt end and a circular recess. The directional lock is movable in a vertical direction in the through-hole. The locking member is L-shaped, containing a horizontal side extending into the tripper and through the through-hole and a vertical side having an inner surface and an outer surface. The horizontal side of the locking member has a through-hole therein. The locking member is movable in a horizontal direction between an aligned position in which the through-hole of the locking member allows the blunt end of the directional lock to pass through and a misaligned position in which the circular recess of the directional lock is locked into the misaligned through-hole of the locking member. The locking spring is located between a side wall of the tripping device and the inner surface of the vertical side of the L-shaped locking member. The solenoid coil is positioned at the outer surface of the L-shaped locking member. The solenoid coil has an iron core. When the solenoid coil is energized, the iron core moves towards the outer surface of the vertical side of the locking member, thereby moving the locking member into the aligned position; and the tripping lever is connected to a hole at the horizontal side of the L-shaped locking member.

The tripper comprises a pair of lifting arms positioned below each of said movable contacts. Also, the bottom of the tripper is operationally connected to the circuit board through a power source switch containing a movable contact located at the bottom of the tripper and a fixed contact located at the circuit board; whereby when the reset button is depressed, the movable contact is in contact with the fixed contact so as to close the power source switch and when the reset button is released, the movable contact is detached from the fixed contact so as to open the power source switch.

The GFCI further comprises a test button (TEST). The test button has a tail end which is extended to an end of the tripping lever. When the test button is depressed, the tail end of the test button presses against the tripping lever, which causes the GFCI to mechanically trip.

The present invention also provides a method for detecting whether the service life of the circuit interrupting device has ended. The first method requires that the user (1) power the circuit interrupting device properly (i.e., without reverse wiring or miswiring); (2) make sure that the device is in a tripped state (if not, the user can depress the test button to manually trip the device); and (3) observe whether the circuit interrupting device can be reset. If the circuit interrupting device can be reset, the service life of the circuit interrupting device has not ended. If the circuit interrupting device cannot be reset, the service life of the circuit interrupting device has ended, and the user should consider replacing the device with a new one. The tripped state can be induced by a ground fault, a simulated leakage current, or by mechanical tripping mechanism. In most occasions, a GFCI manufactured by a factory is generally delivered in a tripped state before being installed.

Optionally, the user can observe whether a normal status indicating light or a problem status indicating light is lighted on the face of the receptacle to determine whether the device has reached the end of the service life or not. If the normal status indicating light is turned on, the circuit interrupting device is still working properly; if the problem status indicating light is turned on, the service life of the circuit interrupting device has ended.

BRIEF DESCRIPTION OF THE DRAWINGS

FIG. 5-1 is a partial cross-section along C-C in FIG. 3, illustrating the initial state of the GFCI.

FIG. 5-2 is a partial cross-section along C-C in FIG. 3, illustrating the normal working state of the GFCI.

FIG. 5-3 is a partial cross-section along C-C in FIG. 3, illustrating the state when the receptacle trips as the test button is depressed.

FIG. 5-4 is a partial cross-section along C-C in FIG. 3, illustrating the state when the receptacle is forcibly tripped by depressing the test button.

FIG. 6-1 is a partial cross-section along A-A in FIG. 3, illustrating the tripping state of the receptacle.

FIG. 6-2 is a partial cross-section along A-A in FIG. 3, illustrating the reset state of the receptacle.

DETAILED DESCRIPTION OF THE INVENTION

Figure 1:
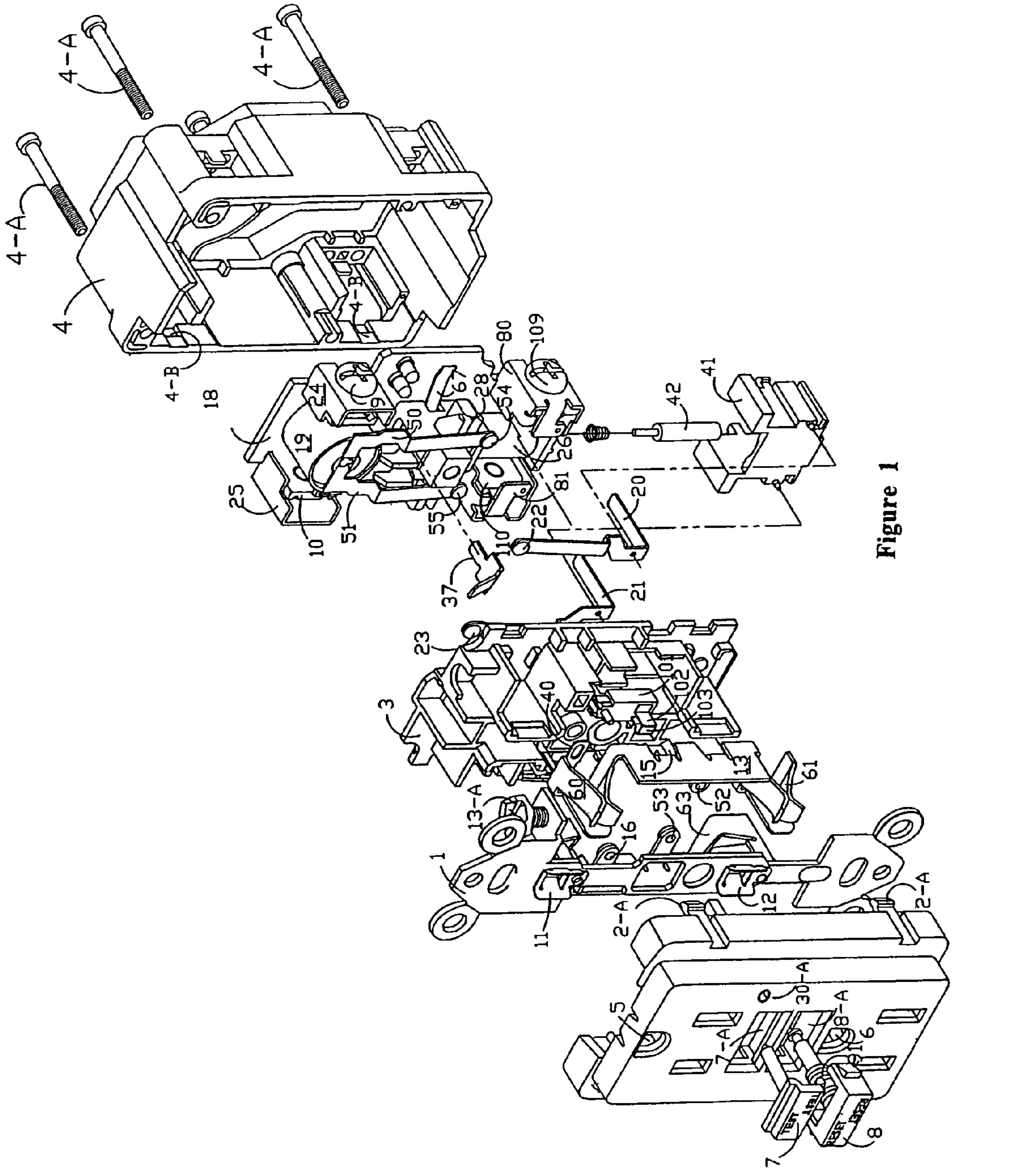
FIG. 1 is a cutaway oblique view illustrating the structure of the present invention.

As shown in FIG. 1, the circuit interrupting device, such as a ground fault circuit interrupter, as disclosed in the present invention, mainly comprises a housing and a circuit board 18, which is installed within the housing. The circuit board 18 not only can control the GFCI to have or not to have power output but also can automatically test whether the service life of the GFCI has ended, that is, whether the circuit still has the electrical leakage or ground fault protection function and can display the test result without operating any parts of the device.

In the housing, there are a front lid 2, an insulated middle support 3 and a base 4. A metal mounting strap 1 is installed between the front lid 2 and the insulated middle support 3. Circuit board 18 is installed between the insulated middle support 3, and the base 4.

Figure 2:
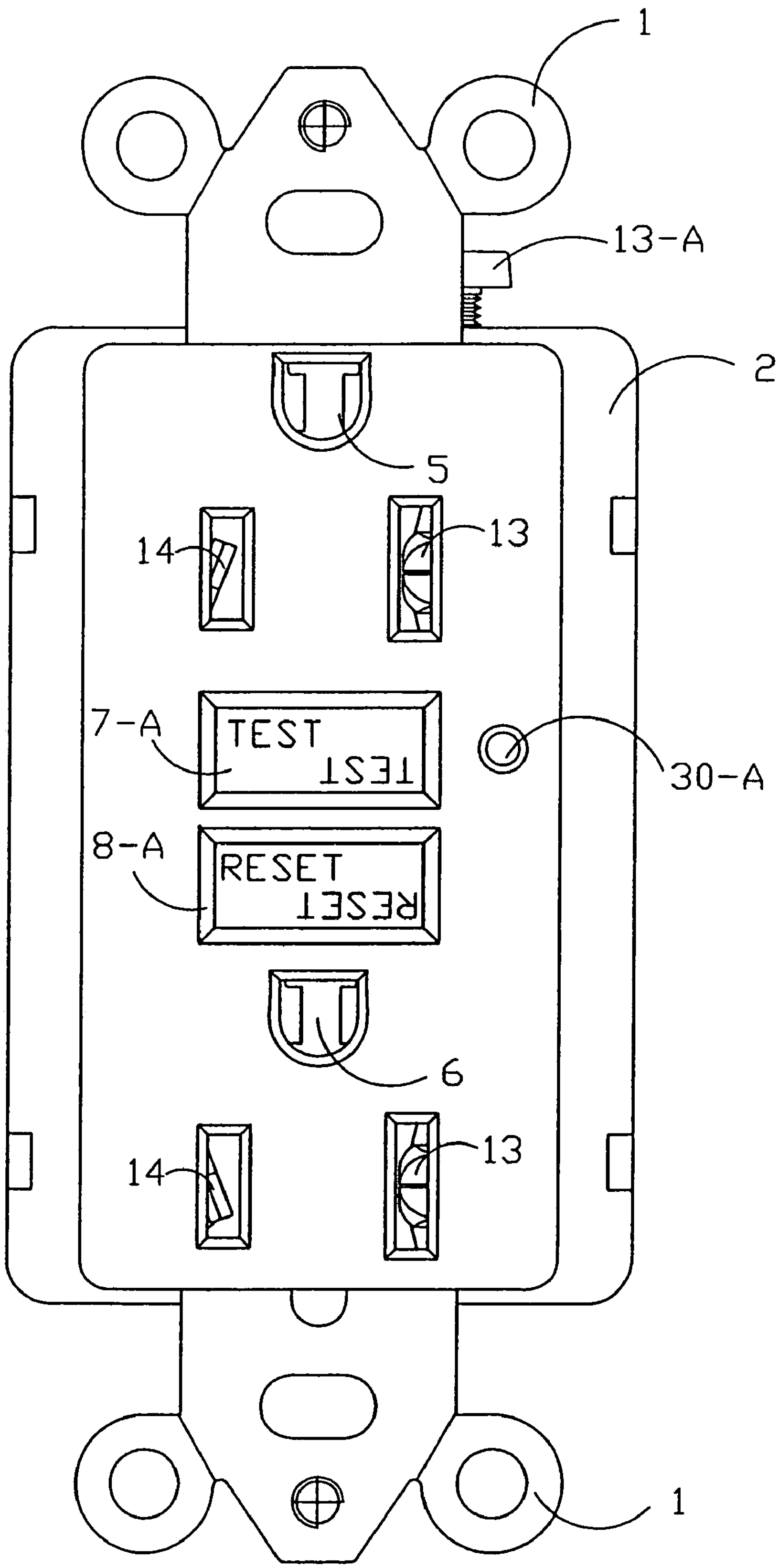
FIG. 2 is the front view of the present invention.

As shown in FIGS. 1 and 2, power output sockets 5, 6, reset button hole 8-A, test button hole 7-A, and status indicating light hole 30-A are found on front lid 2. Reset button (RESET) 8 and test button (TEST) 7 are installed in reset button hole 8-A and test button hole 7-A, respectively. Reset button 8 and test button 7 penetrate through metal mounting strap 1 and insulated middle support 3 to make contact with the parts on circuit board 18. Four hooks 2-A are arranged on the side of front lid 2 to hook in the slot 4-B on base 4.

Metal mounting strap 1 is grounded through grounding screw 13-A (as shown in FIGS. 1-2) and wires. Grounding pieces 11, 12 are arranged on metal mounting strap 1 at places corresponding to the grounding holes of power output sockets 5, 6 of front lid 2.

Figure 3:
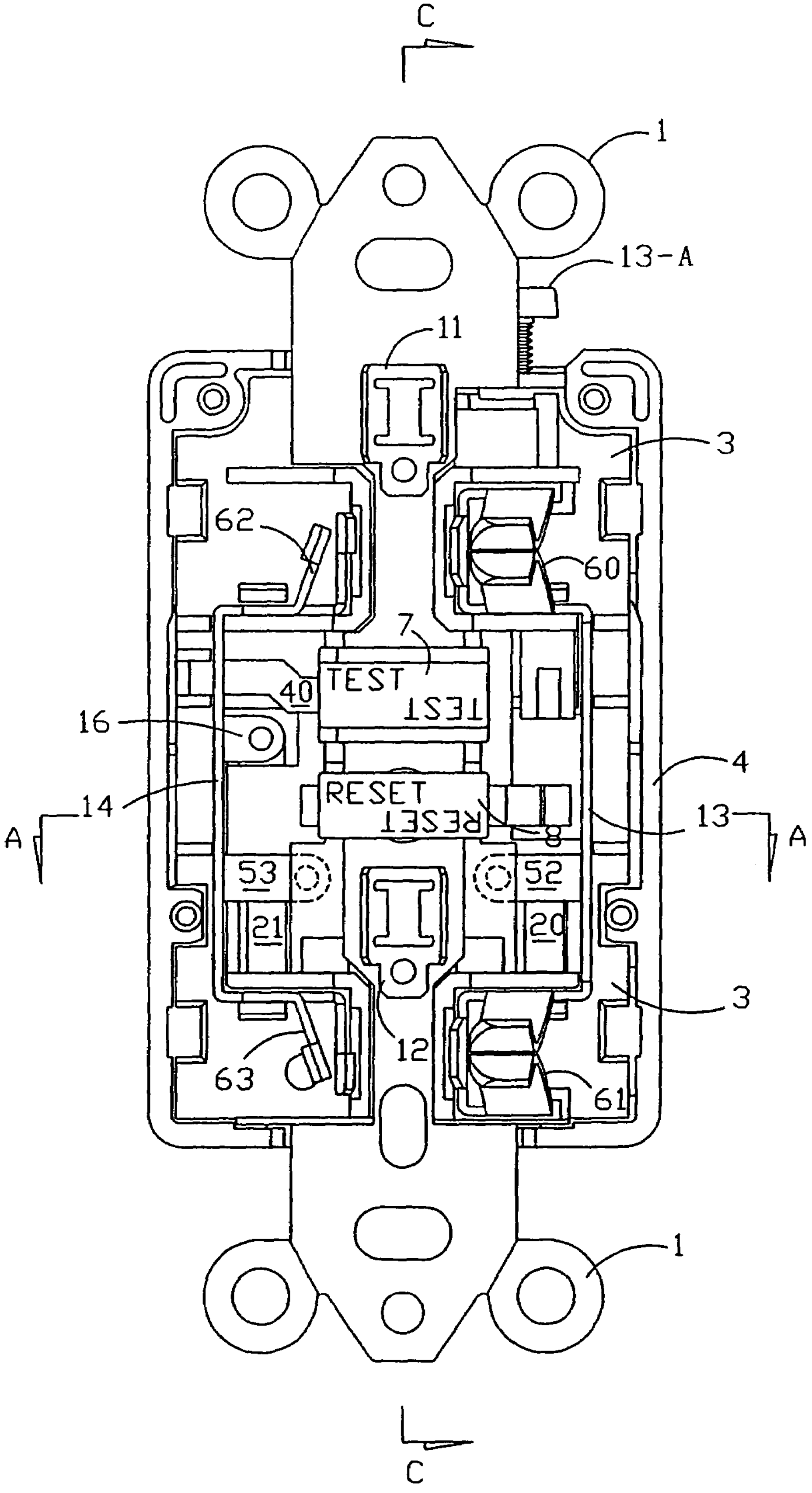
FIG. 3 is the front view of the present invention with the top cover removed.

As shown in FIGS. 1 and 3, a hot power output conductor 14 and a neutral power output conductor 13 are installed on the two sides of the insulated middle support 3. At the two ends of power output conductors 13, 14, gripping wing pieces 60, 61, 62, 63 are arranged at the places corresponding to the hot and neutral holes of power output sockets 5, 6 on the front lid 2. Fixed contacts 15, 52 and 16, 53 are arranged on power output conductors 13, 14, respectively, to form two pairs of fixed contacts 15, 16 and 52, 53.

As shown in FIG. 1, base 4 is used to accommodate insulated middle support 3 and circuit board 18. A pair of hot and neutral power input wiring screws 9, 10 and a pair of hot and neutral power output wiring screws 109, 110 are installed symmetrically on the two sides of base 4.

The key part of the present invention is the circuit board 18, which is installed in the housing. The circuit board 18 supplies power to or cuts power from the power output sockets 5, 6 of front lid 2 and the power output wiring screws 109, 110 on the two sides of base 4 and has the capability of automatically detecting whether the service life of the GFCI has ended.

Figure 4:
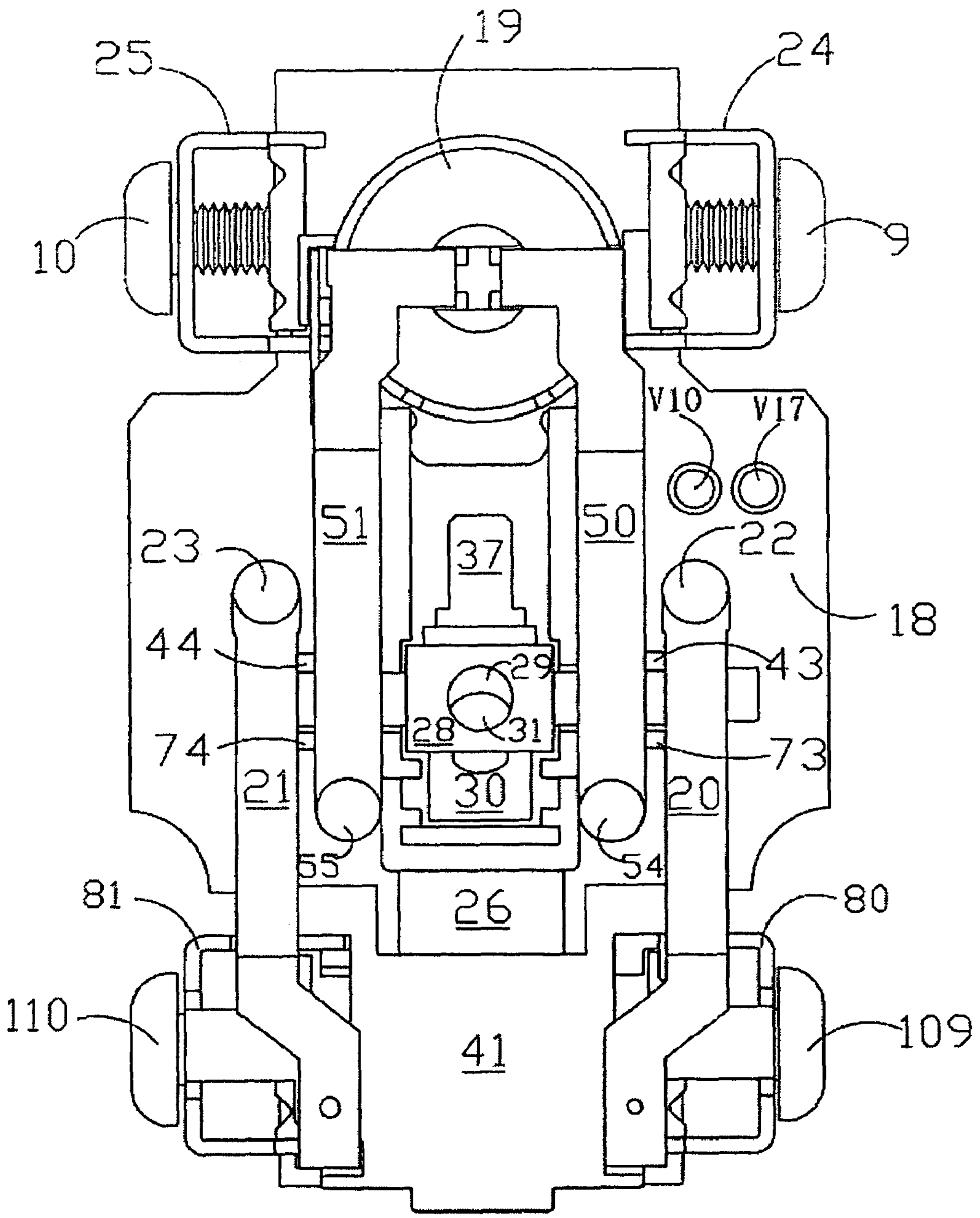
FIG. 4 is a diagram illustrating the positional relationship of each part on the circuit board in the present invention.
Figure 5A:
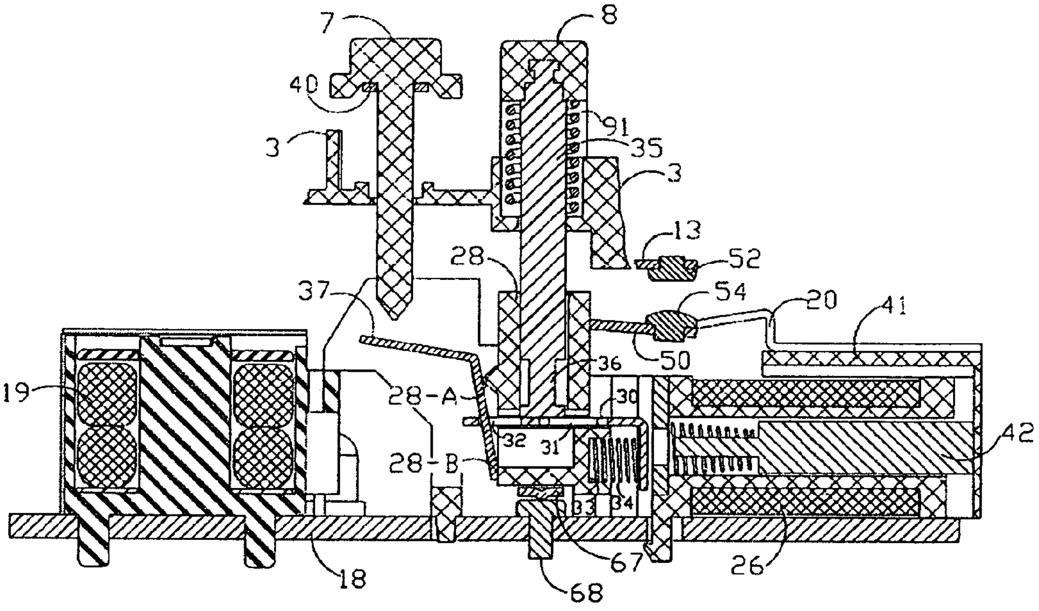
Figure 5B:
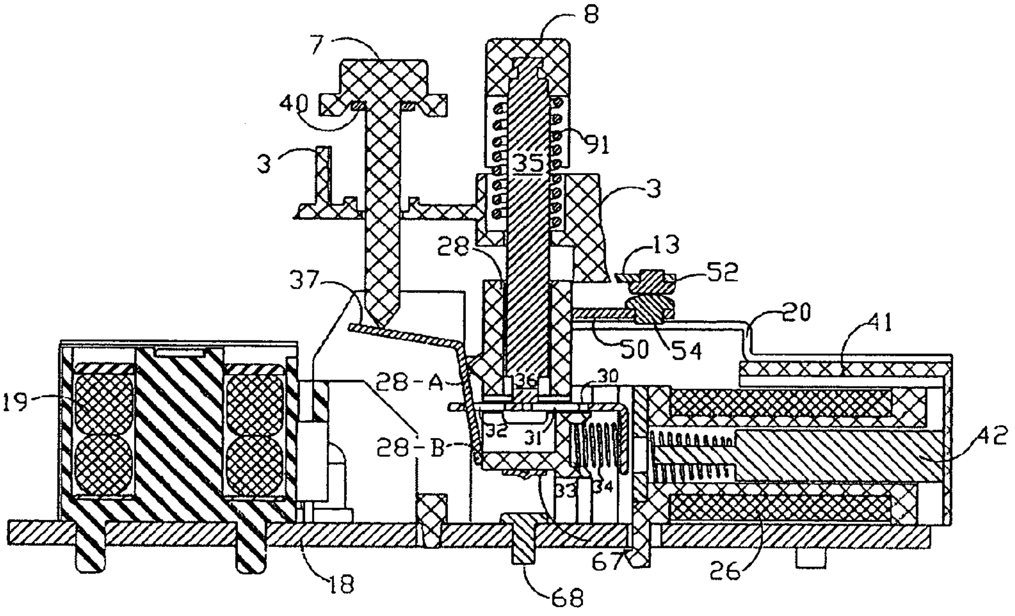
Figure 5C:
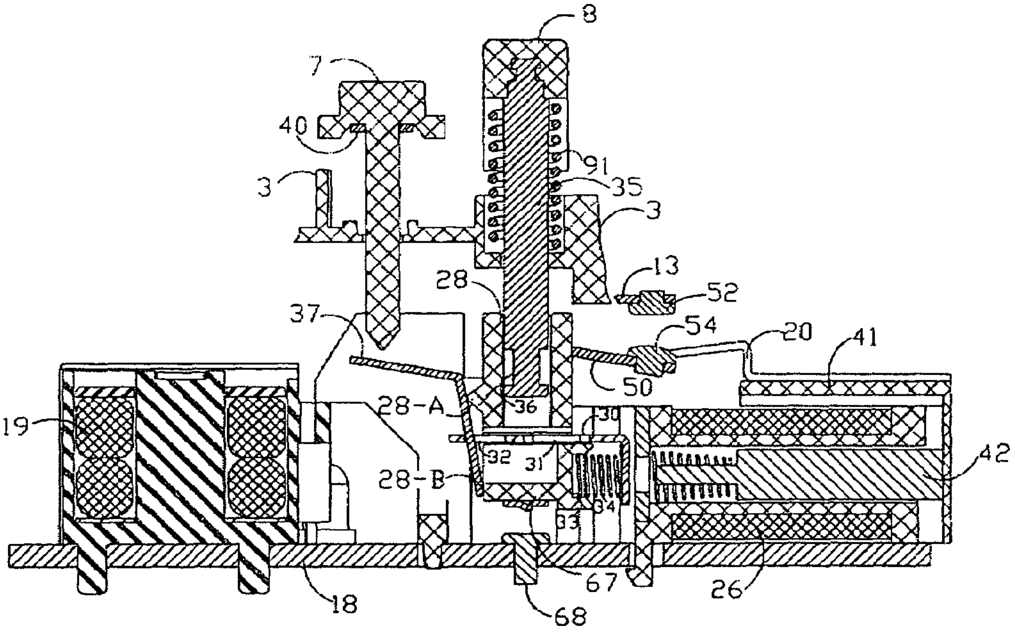
Figure 5D:
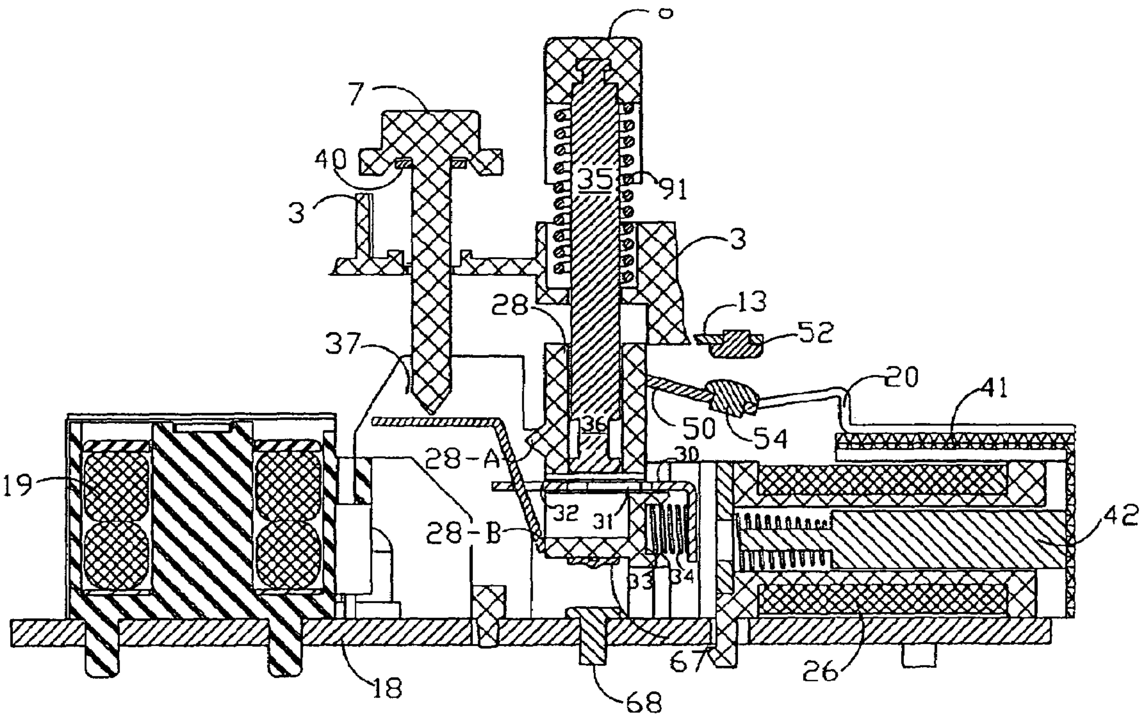
Figure 8:
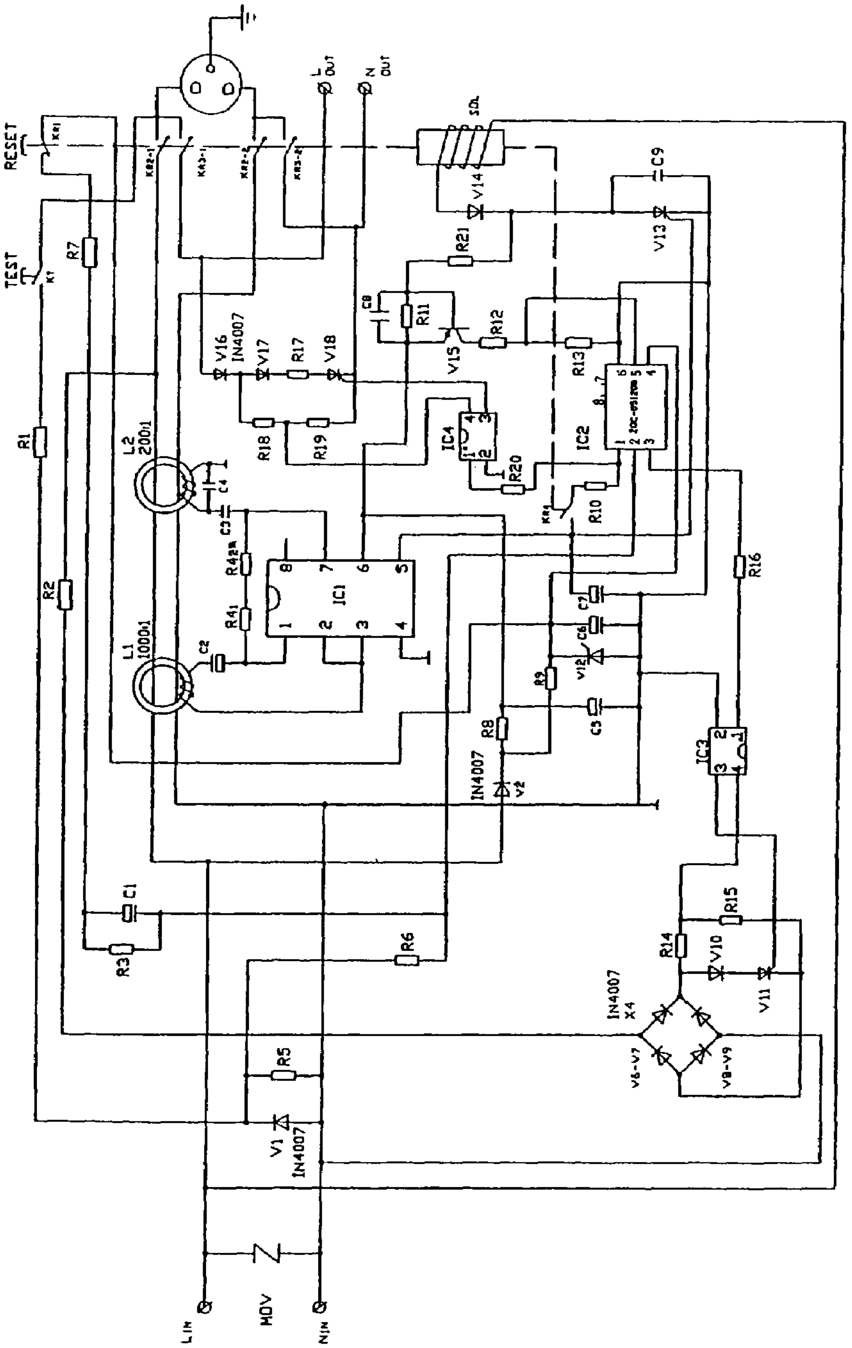
FIG. 8 is a detailed circuit diagram of the control circuit used in the present invention.

As shown in FIGS. 1 and 4, two resilient power input metal pieces 50, 51 are arranged on circuit board 18. One end of the flexible power input metal pieces 50, 51 is bent downward at a 90° angle, penetrates through differential transformer 19, and is soldered onto circuit board 18, and is connected to hot and neutral power input wiring screws 9, 10 via input wiring pieces 24, 25. Neutral power input wiring screw 9 is connected to the neutral wire of the power supply inside the wall via a conductive wire. Hot power input wiring screw 10 is connected to the hot wire of the power supply inside the wall via a conductive wire. Movable contacts 54, 55 are arranged at the other end of flexible power input metal pieces 50, 51. The movable contacts 54, 55 correspond to the fixed contacts 52, 53 (as shown in FIG. 3) on the power output conductors 13, 14, respectively, which are arranged on insulated middle support 3. Two flexible metal output pieces 20, 21 are arranged on two sides above circuit board 18. One end of the flexible metal output pieces 20, 21 is soldered together with the metal pieces 80, 81 onto the printed-circuit board and is connected to the power output wiring screws 109, 110 on the two sides of base 4. Movable contacts 22, 23 are arranged at the other end of the flexible metal output pieces 20, 21. The movable contacts 22, 23 correspond to the fixed contacts 15, 16 on power output conductors 13, 14 (as shown in FIG. 3). As shown in FIG. 8, the movable contact 55 on the hot power input metal piece 51 and the fixed contact 53 on hot power output conductor 14 form a pair of switches KR2-1. The movable contact 54 on neutral power input metal piece 50 and the fixed contact 52 on neutral power output conductor 13 form a pair of switches KR2-2. The fixed contact 16 on hot power output conductor 14 and the movable contact 23 on flexible metal piece 21 form a pair of switches KR3-1. The fixed contact 15 on neutral power output conductor 13 and the movable contact 22 on flexible metal piece 20 form a pair of switches KR3-2. The movable contacts and fixed contacts on the power input metal pieces 50, 51, power output conductors 13, 14, and flexible metal output pieces 20, 21 form two groups of four pairs of power switches KR2-1, KR2-2, KR3-1, KR3-2.

As shown in FIGS. 1, 4, and 5-1, a tripping device, which can effect power connection/disconnection between flexible power input metal pieces 50, 51 and power output conductors 13, 14 and can supply or interrupt electric power to or from flexible metal output pieces 20, 21 through power output conductors 13, 14 to effect power connection/disconnection with respect to power output conductors 80, 81, is also arranged on circuit board 18. This tripping device includes tripper 28, locking member 30, locking spring 34, tripping lever 37, and solenoid coil 26.

The tripper 28 is located below reset button 8 and has a cylindrical shape. Its left and right sides extend outwardly to form lifting arms. The flexible power input metal pieces 50, 51 and flexible metal output pieces 20, 21 are located above the left and right lifting arms and can move up and down along with tripper 28. Also, as shown in FIG. 4, the movable contact 54 on power input metal piece 50 and the movable contact 22 on flexible metal output piece 20 cross each other at a position above the side lifting arm of tripper 28. Similarly, the movable contact 55 on power input metal piece 51 and the movable contact 23 on flexible metal output piece 21 also cross each other at a position above the side lifting arm of tripper 28.

A longitudinal central through-hole 29 is formed at the top of tripper 28. Reset directional lock 35 equipped with reset spring 91 and embedded in the bottom of reset button 8 can move up and down along central hole 29. The reset directional lock has a blunt end. The directional lock is movable in a vertical direction in the central through-hole. A circular recessed locking slot 36 is formed in the lower part of reset directional lock 35 close to the bottom of the directional lock to form a groove. A movable "L"-shaped locking member 30 made of a metal material is arranged in the lower part of tripper 28 and penetrates through tripper 28. A through-hole 31 is formed in the horizontal side of locking member 30.

The locking member 30 is movable through the through-hole in a horizontal direction between an aligned position in which the through-hole of the locking member 30 is aligned with the blunt end of the directional lock 35 to allow the directional lock to pass through and a misaligned position in which the circular recess of the directional lock 35 is locked into the through-hole of the locking member 30. A circular slot 33 is formed between the side wall of tripper 28 and the inner side of locking member 30. A locking spring 34 is arranged in the circular slot. A solenoid coil 26 with a movable iron core 42 arranged inside is arranged outside the side wall of locking member 30. The movable iron core 42 inside solenoid coil 26 faces the side wall of locking member 30. A protective cover 41 is arranged above solenoid coil 26. One end of the insulated middle support presses against the protective cover 41.

A hole 32 is formed at one end on the top surface of locking member 30. A "7"-shaped tripping lever 37 penetrates through-hole 32. Tripping lever 37 is located directly underneath the test button 7. A pivot 28-A is arranged on the side wall of tripper 28 close to tripping lever 37. Tripper lever 37 can rotate around the pivot 28-A on the side wall of tripper 28.

Tripper 28, locking member 30, locking spring 34, and tripping lever 37 are connected to each other to form an integral body that can move freely.

According to the present invention, the movable iron core 42 located within the solenoid coil 26 can be moved toward and push locking member 30 when the solenoid coil is energized. As a result, reset directional lock 35 embedded in the bottom of reset button (RESET) 8 can move up and down along central through-hole 29 of tripper 28 and the locking member hole 31 of locking member 30 to reset or trip reset button 8 to ensure whether or not the GFCI has or does not has power output. In other words, in the present invention, reset button 8 is reset or tripped through the tripping device so that the GFCI may or may not have power output.

As shown in FIGS. 4 and 8, there is also a differential transformer 19 (coils L1, L2 in FIG. 8), which is used for detecting leakage current on circuit board 18. Hot wire HOT and neutral wire WHITE penetrate the differential transformer. When ground fault occurs in the power supply circuit, the differential transformer will output a voltage signal to leakage current detection control chip IC1 (such as model RV4145). Pin 5 of chip IC1 will output a control signal to turn on silicon-controlled rectifier (SCR) V13 to trip the device on circuit board 18 so as to interrupt the power output.

Figure 6A:
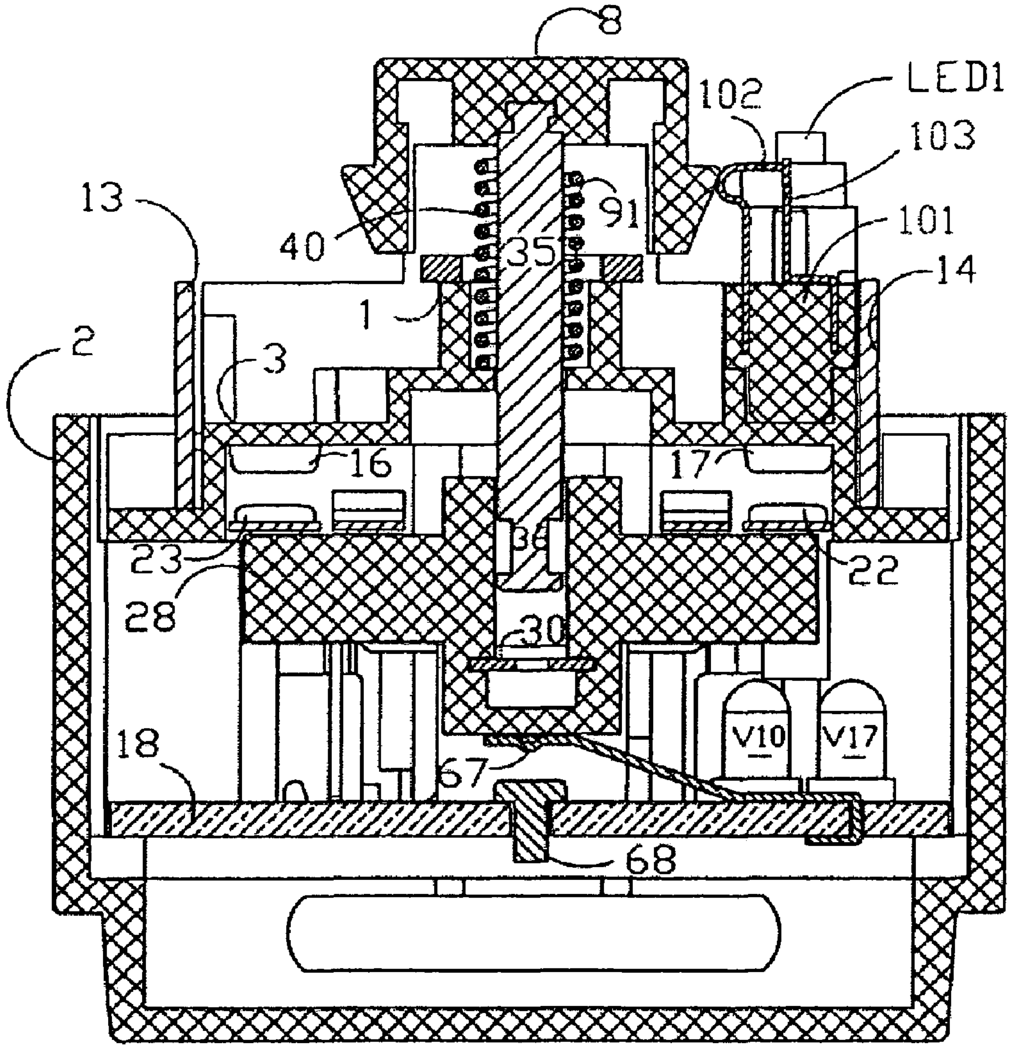
Figure 6B:
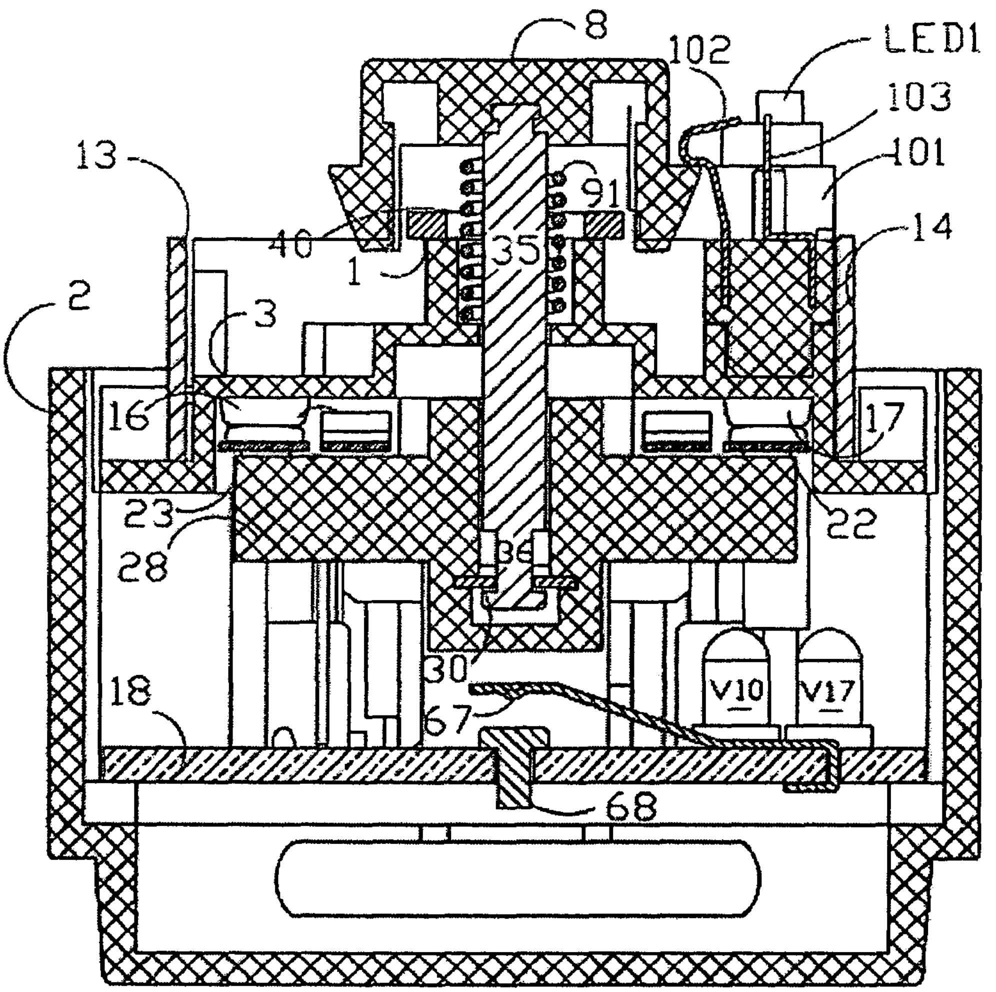

As shown in FIG. 4, circuit board 18 has two indicating lights used for indicating whether or not the service life of the GFCI has ended. One of the lights is normal status indicating light V17, while the other is problem status indicating light V10. As shown in FIGS. 6-1 and 6-2, light-guiding tube LED1 arranged in the longitudinal direction is set on the indicating lights V17 and V10. The top of light-guiding tube LED1 is located below the indicating light hole 30-A on the surface of front lid 2. The light emitted from the two indicating lights V17, V10 is refracted through light-guiding tube LED1 to the surface of the ground fault circuit interrupter.

As shown in FIGS. 6-1, 6-2, 8, the present invention also utlilizes a switch KR1, which opens (i.e., non-conductive) and closes (i.e., conductive) in connection with reset button 8 (RESET). The switch KR1 comprises fixing frame 101 and two spring pieces 102, 103. Spring piece 102 is connected to pin 2 of end-of-service-life detecting integrated circuit chip IC2, with a model no. of ZQC-051208, through resistors R7, R3 and capacitor C1. Spring piece 103 is connected to pin 4 of end-of-service-life detecting integrated circuit chip IC2. When the reset button is in the tripped state, the spring piece 102 of switch KR1 is in contact with spring piece 103 due to the inclined side surface of the reset button to enter the conductive state (FIG. 6-1). When the reset button is at the reset state, since the inclined side surface of the reset button moves downwards, spring piece 102 restores the original shape and is separated from spring piece 103 to enter the non-conductive state (FIG. 6-2). Therefore, in connection with the state of the reset button (RESET) 8 (i.e., in a tripped state or a reset state), the switch KR1 is capable of sending a signal to end-of-service-life detecting integrated circuit chip IC2 to test the main components of the GFCI.

As shown in FIGS. 5-1 and 8, there is a power source switch KR4 made of a flexible metal material between the bottom of tripper 28 and circuit board 18. Power source switch KR4 comprises two spring pieces 67, 68. Spring piece 67 is connected to pin 5 of leakage detection control chip IC1, while spring piece 68 is connected to pin 1 of end-of-life detecting chip IC2 through resistor R10. The power source switch KR4 also interacts with reset button (RESET) 8. When reset button RESET is pressed down, power source switch KR4 is closed. When reset button (RESET) 8 is released, power source switch KR4 is opened.

The IC power supply mode used in the present invention is a half-wave rectifier with a capacitor filter and a half-wave rectifier with a serial constant-voltage filter. For example, V3, R7, C6 are VCC1; V2, R8, V3, C7 are VCC2.

Figure 7:
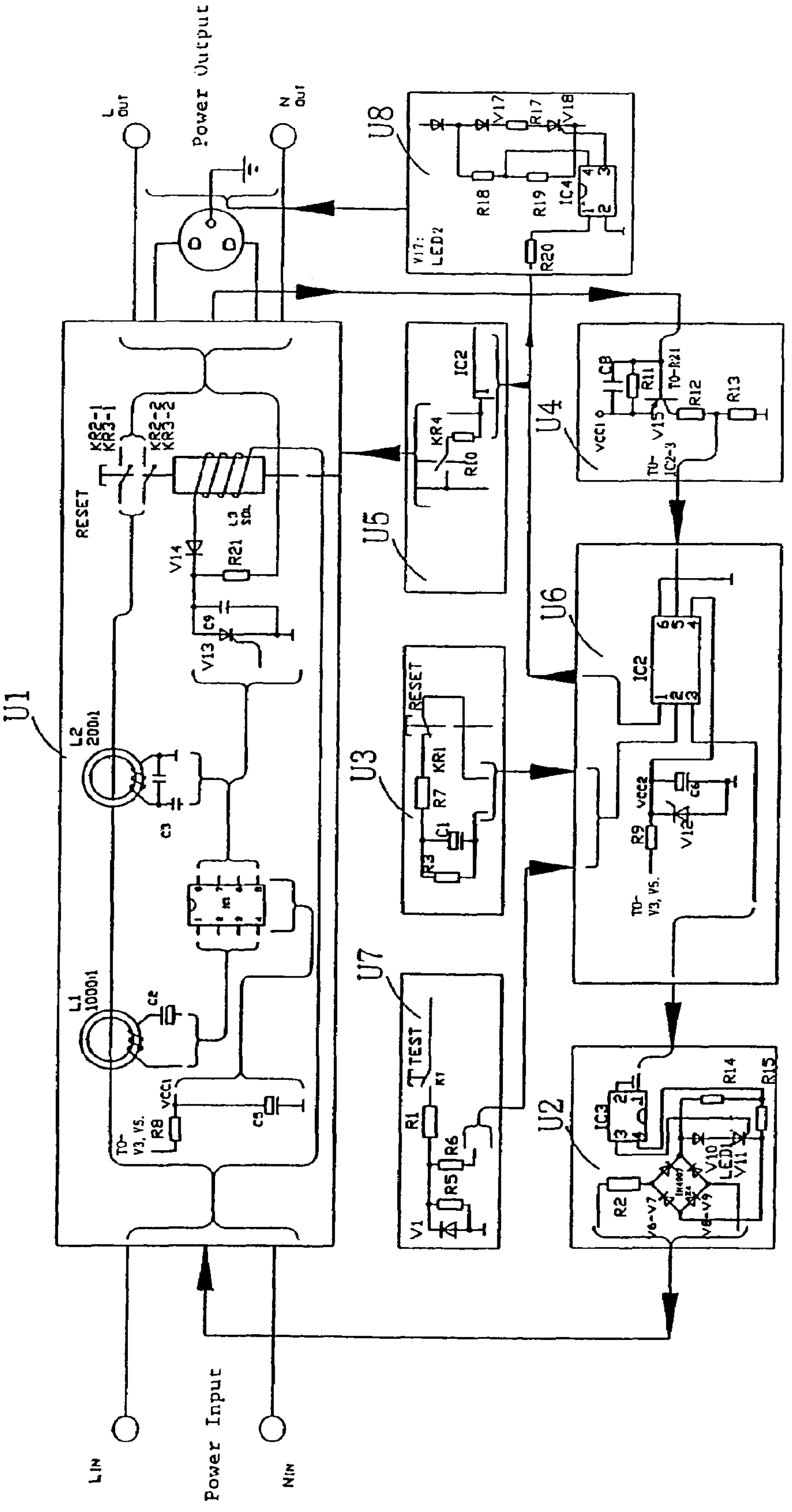
FIG. 7 is a logic closed-loop block diagram of the control circuits used in the present invention.

FIG. 7 is the logic principle block diagram used by the control circuit in the present invention for realizing the leakage protection and the end-of-service-life detecting function. There are 8 circuits in the GFCI, namely U1, U2, U3, U4, U5, U6, U7, and U8. As shown in FIG. 7, main circuit U1 is used for detecting leakage current and resetting/tripping of the reset button; circuit U2 is used for generating a simulated leakage and displaying the status of the GFCI; circuit U3 is used for identifying the reset/trip state of the reset button; circuit U4 is the simulated testing and feedback circuit; circuit U5 is used for resetting a voltage output; U6 is the end-of-service-life detecting circuit; U7 is the manual testing circuit; and U8 is used for providing output voltage to the receptacle display. A test circuit which is capable of generating a simulated leakage current/ground fault to test the main components of the GFCI contains certain portions of circuits U2, U3, U4, U5, and U6. Optionally, a certain portion of circuit U8 can be included. The detailed circuitry as depicted in FIG. 7 is for illustration only. An artisan with ordinary skill in the field would know which portions of the circuits are required to construct the test circuit.

The test circuit contains an end-of-service life detecting chip (IC2), which is located in circuit U6. IC2 is given a model no. ZQC-051208 by the inventors. IC2 has 8 pins, including two pins, i.e., pins 7 and 8, which are currently reserved for other purposes in the future. Pin 1 of IC2 is for outputting a voltage signal to reset a circuit interrupting device. Pin 2 of IC2 is for receiving a signal from switch KR1 to detect the state of the device (i.e., in a tripped state or a reset state). Pin 3 of IC2 is for sending a signal to U2 to generate a simulated leakage current. Pin 4 of IC2 is for receiving power for IC2. Pin 5 of IC2 is for receiving a feedback signal. Pin 6 of IC2 is a grounding pin.

When the power input terminals $L_{IN}$, $N_{IN}$ of the GFCI are properly connected to the hot and neutral wires of the power sources inside the wall, i.e., without reverse wiring or miswiring, the device is powered. For most of the new device, the GFCI is in the tripped state. Switch KR1, which is a part of circuit U3 and whose two spring pieces are in connection with the reset button (RESET), recognizes the tripped state of the device and becomes conductive (i.e., in a closed condition). The closing of switch KR1 produces a signal which is sent through U3 to pin 2 of the end-of-service life detecting chip (IC2) in circuit U6, which in turn sends a signal from pin 3 to circuit U2 to generate a simulated leakage current. The simulated leakage current passes through circuits U1 and U4. When the GFCI is working properly, circuit U4 sends a signal denoting that a normal condition has been reached to the feedback signal receiving pin 5 of IC2, which in turn keeps pin 1 of IC2 at a high voltage level and sends a signal to circuit U5 to allow the device to be reset. Optionally, the elevated voltage level of pin 1 of IC2 can send a signal to activate the normal status indicating light V17 in circuit U8 through optical coupler IC4. As a result, the normal status indicating light on the face of the receptacle is lighted, preferably in green. At the same time, pin 3 of IC2 is changed to a low voltage level, and as a result, the simulated leakage current generated by circuit U2 is stopped. At this time, if the reset button (RESET) is depressed, the GFCI can be reset and function properly. Due to the mechanical interaction between the reset button (RESET) and switch KR1, switch KR1 is opened and becomes non-conductive.

If any main components in the GFCI are defective, i.e., if the service life of the device has ended, circuit U4 is incapable of sending a normal state signal to pin 5 of IC2 to allow pin 1 of IC2 to elevate to a high voltage level. As a result, pin 1 of IC2 is at a low voltage level so that no signal can be output to U5 and the device is incapable of being reset. Optionally, since pin 3 of IC2 continues to have a high voltage output, the problem status indicating light V10 of circuit U2 through optical coupler IC3 is turned on and displayed on the face of the receptacle. The lighting of the problem status indicating light reminds the users that the GFCI has reached the end of the service life and should be replaced. The problem status indicating light is preferably to be red or yellow.

Besides the automatic generation of a simulated leakage current through circuit U2, which is capable of checking whether the circuit interrupting device still has the electrical leakage protection function after being powered, the receptacle disclosed in the present invention can also generate a simulated leakage current through a manual test circuit U7 when the user presses test button (TEST) 7 to trip the device.

FIG. 8 is a detailed circuit diagram of the control circuit used in the present invention. The main components include, but are not limited to, differential transformer L1, L2 used for detecting leakage current, leakage detection control chip IC1, end-of-service-life detecting integrated circuit chip IC2, optical couplers IC3, IC4, a silicon control rectifier, and a solenoid coil. The circuit for automatically generating a simulated leakage current in the receptacle of the present invention contains serially connected resistor R2 and rectifier/diode bridge V6-V9. One end of resistor R2 is connected to hot wire $L_{IN}$ of the power input terminal, while the other end is connected to neural wire $N_{IN}$ of the power input terminal through rectifier/diode bridge V6-V9. When the GFCI is powered, and is in the tripped state, the serially connected resistor R2 and rectifier/diode bridge V6-V9 automatically short-circuit the hot and neutral wires to generate a simulated leakage current/ground fault.

If the GFCI is working properly and when a leakage current occurs in the circuit, the differential transformers immediately sense a voltage signal at a certain level and send it to signal input pins 1 and 2 of leakage detection control chip IC1. Pin 5 of chip IC1 then outputs a signal to the gate of SCR V13 to trigger and turn on SCR V13. As a result, the solenoid coil (SOL) in the tripping device is powered, and the iron core inside the SOL moves to trip the tripping device so as to interrupt the power output. After the GFCI is tripped, because the reset button (RESET) is in the tripped state, switch KR1 in circuit U3 is closed and becomes conductive due to interaction with the reset button (RESET), which causes the GFCI to automatically generate a simulated leakage current to test the device again.

Also, if the GFCI is working properly, the voltage level at pin 1 of the end-of-service-life detecting chip IC2 in U6 is elevated and outputs an elevated voltage level to U5 to allow the device to be reset. Optionally, the output signal of pin 1 of IC2 can also be connected to circuit U8 to enable optical coupler IC4 in U8 to function. U8 contains a normal status indicating light which, when activated, can be output to light up the normal status indicating light on the face of the receptable. As a result, silicon-controlled rectifier (SCR) V18 becomes conductive, and normal status indicating light V17 is turned on.

On the other hand, if any of the main components in the GFCI are damaged or defective, i.e., when the service life of the GFCI has ended, pin 1 of the end-of-service life detecting chip IC2 in U6 does not send a signal to U5 to activate the reset mode to allow the GFCI to reset. As a result, the GFCI cannot be reset, and the voltage level at pin 3 of IC2 is elevated to enable optical coupler IC3 in U2 to function. Silicon-controlled rectifier (SCR) V11 therefore becomes conductive, and problem status indicating light V10 is turned on to remind the user to replace the device with a new one. The problem status indicating light V10 is preferably to be either a red or a yellow light.

If the GFCI is working properly, when a ground fault or a leakage current is detected, the differential transformers sense a certain volume of imbalance voltage passing through and send a signal to input pins 1 and 2 of the leakage current detecting chip IC1, which outputs a control signal from pin 5 of IC1 to the gate of SCR V13 to activate SCR V13. After SCR V13 becomes conductive, it energizes the solenoid coil (SOL) of the tripping device, and causes the movable iron core within the SOL to plunge the tripping device so as to trip the GFCI and interrupt the power output. Due to the tripping of the reset button (RESET), switch KR1, which interacts with the reset button (RESET), is pushed to close, which sends a signal to the test circuit and activates the testing of the GFCI. At this time, if all of the main components of the GFCI still function properly, pin 1 of IC2 in circuit U6 is changed to a high voltage level, which sends a signal to U5 to allow the reset button (RESET) to reset or optionally sends a signal to the optical coupler IC4 in circuit U8 to activate SCR V18. Once SCR V18 becomes conductive, the normal status indicating light V17 is turned on.

On the other hand, if any of the main components in the GFCI are damaged or defective, i.e., if the service life of the GFCI has ended, pin 1 of IC2 in circuit U6 shows a lower voltage level. As a result, no signal can be sent to U5, so that reset button (RESET) cannot be reset. At the same time, pin 3 of IC2 outputs an elevated voltage level, which sends a signal to optical coupler IC3 to activate SCR V11. Once SCR V11 becomes conductive, the problem status indicating light is turned on, which reminds a user that the service life of the GFCI has ended, and that he/she should replace the GFCI.

As shown in FIG. 8, once the automatic testing of the end of service life of the device has been completed, and the device is found to be working normally and is able to provide electrical leakage or ground fault protection, the voltage level at pin 1 of the end-of-service-life detecting chip IC2 is elevated. When the user presses the reset button (RESET), since switch KR4 interacts with the reset button (RESET), switch KR4 is closed at the same time when reset button (RESET) is pressed down. SCR V13 is triggered to become conductive. Solenoid coil (SOL) is powered so that current flows through it to generate a magnetic field. The iron core inside the coil moves to push locking member 30 of the tripping device of the GFCI to move. As shown in FIG. 5-2, the lock slot 36 of reset directional lock 35 embedded at the bottom of the reset button (RESET) is seized in the lock hole 31 of locking member 30. Reset button (RESET) is released, driving tripper 28 to move up to elevate the flexible metal pieces 50, 51, 20, 21 located above the lifting arms on the two sides of tripper 28. As a result, the movable contacts 54, 55 on flexible power input metal pieces 50, 51 make contact with the fixed contacts 52, 53 on power output conductors 13, 14 to power up output conductors 13, 14. This allows the flow of electricity to the power output sockets 5, 6 on the face of the GFCI. Also, the movable contacts 22, 23 on flexible metal pieces 20, 21 make contact with the fixed contacts 15, 16 on power output conductors 13, 14 to power the flexible metal pieces 20, 21, which are in contact with power output terminals 80, 81. This allows electricity to be output to power output terminals 80, 81 of the GFCI and to the power output sockets 5, 6 on the face of the receptacle, and thereby the GFCI operates normally.

As shown in FIGS. 8, and 5-3, when test button (TEST) is pressed down, a simulated leakage current is generated. After differential transformers L1, L2 (differential transformers 19) detect the leakage current, they output a voltage signal to leakage current control chip IC1, which elevates the voltage at pin 5 of chip IC1, which in turn makes SCR V13 conductive. A current flows through solenoid coil 26 (SOL) to generate an electromagnetic field, which pulls in iron core 42 to push locking member 30 to move, as shown in FIG. 5-3. The bottom part of lock slot 36 of reset directional lock 35 penetrates central hole 31 of locking member 30. Reset button 8 is tripped, and allows tripper 28 to drop. The flexible power input metal pieces 50, 51, 20, 21 located above the two lifting arms of tripper 28 drop as well to disconnect the movable contacts 54, 55 on flexible power input metal pieces 50, 51 from the fixed contacts 52, 53 on power output conductors 13, 14. The fixed contacts 15, 16 on power output conductors 13, 14 are disconnected from the movable contacts 22, 23 on flexible metal pieces 20, 21 so that neither power output conductors 13, 14 nor flexible metal pieces 20, 21 are powered. As a result, there is no power output to the power output terminals 80, 81 of the GFCI or to the power output sockets 5,6 on the face of the front lid 2 of the GFCI, so that the entire power output of the GFCI is interrupted.

The present invention also allows the user to forcibly and mechanically trip reset button (RESET) 8 by pressing test button (TEST) 7 to interrupt the power output of the GFCI. As shown in FIG. 5-4, test button (TEST) 7 has a tail end which penetrates through insulated middle support 3, which touches upon the end of tripping lever 37. When the service life of the GFCI has ended and the reset button (RESET) cannot be tripped by using simulated leakage current, the user can further press down test button (TEST) 7 to forcibly trip the device. This tail end has a slipped over spring 40. If the user wants to detect whether the mechanical operation of the GFCI is operational and reliable, he/she can depress test button (TEST) 7. The tail end of test button 7 pushes the end of tripping lever 37 to move downwards to pull locking member 30. Locking spring 34 on the other side of the locking member is compressed. The lock slot 36 on directional lock 35 jumps out of locking hole 31 on locking member 30. Tripper 28 falls, and flexible power input metal pieces 50, 51 fall as well. The movable contacts on the flexible power input metal pieces are disconnected from the fixed contacts on power output conductors 13, 14. As a result, power output conductors 13, 14 are not electrified. The flexible metal pieces 20, 21 connected to power output terminals 80, 81 are not electrified, either. Since neither power output conductors 13, 14 nor power output terminals 80, 81 are electrified, no power is output to the load terminals, that is, power output terminals 80, 81 of the GFCI or to the power output sockets 5, 6 on the face of the GFCI front lid 2.

As shown in FIG. 4, two pairs of position limiting pieces 43, 44 and 73, 74 are arranged on the coil frame 41 of solenoid coil 26 below the movable contacts of flexible power input metal pieces 50, 51 and below flexible metal pieces 20, 21.

As described above, the present invention not only provides electrical leakage or ground fault protection but also can automatically check whether the service life of the GFCI has ended and display the test result by means of the indicating lights after the device of the present invention is connected to the hot and neutral wires of the power line inside the wall. If the GFCI still has electrical leakage or ground fault protection, the reset button can be reset normally, and the normal status indicating light is turned on, which indicates that the GFCI is working properly and there is power output from the device. If the service life of the GFCI has ended, the end-of-service-life detection control chip IC2 prohibits the resetting of the reset button, so that no power is output to the power output sockets on the face of the front lid 2 or load output terminals of the GFCI. This provides a signal to the user that the GFCI should be replaced. In addition, when a certain component in the GFCI becomes defective, for example, when the solenoid coil is unable to work properly, it is possible to forcibly interrupt the power output of the receptacle in a mechanical manner by pressing the test button. This invention has powerful functions and provides good safety. It can be used to guarantee the safety of the user and to protect electrical appliances.

While the invention has been described by way of examples and in terms of the preferred embodiments, it is to be understood that the invention is not limited to the disclosed embodiments. On the contrary, it is intended to cover various modifications as would be apparent to those skilled in the art. Therefore, the scope of the appended claims should be accorded the broadest interpretation so as to encompass all such modifications.

We claim:

1. A circuit interrupting device comprising:

a test circuit which automatically generates a simulated leakage current to test components of said circuit interrupting device;

wherein said test circuit comprises an end-of-service-life detecting integrated circuit chip; and wherein said end-of-service-life detecting integrated circuit chip is connected to a switch which interacts with a reset button;

whereby when said circuit interrupting device is powered and said circuit interrupting device is in a tripped state, if all of said components of said circuit interrupting device are working properly, said test circuit allows said circuit interrupting device to be reset;

whereby when said circuit interrupting device is powered and said circuit interrupting device is in a tripped state, if at least one of said components of said circuit interrupting device is not working properly, said test circuit prevents said circuit interrupting device from being reset;

whereby when said circuit interrupting device is in a tripped state, said switch is conductive which sends a signal to said end-of-service life detecting integrated circuit chip to generate a simulated leakage current to test said components of said circuit interrupting device;

whereby when all of said components of said circuit interrupting device are working properly, said reset button is capable of being reset; and whereby when at least one of said components of said circuit interrupting device is not working properly, said reset button is not capable of being reset.

2. The circuit interrupting device according to claim 1, wherein when said circuit interrupting device is in a reset state, said switch is non-conductive.

3. The circuit interrupting device according to claim 1, wherein said switch comprises a fixed frame and two spring pieces; and wherein said two spring pieces are connected to different pins of said end-of-service-life detecting integrated circuit chip, respectively.

4. The circuit interrupting device according to claim 1, wherein said end-of-service life detecting integrated circuit chip is adapted to connect to a normal status indicating light and a problem status indicating light;

whereby when all of said components of said circuit interrupting device are working properly, said normal status indicating light is turned on; and whereby when at least one of said components of said circuit interrupting device is not working properly, said problem status indicating light is turned on.

5. The circuit interrupting device according to claim 4 wherein each of said normal status indicating light and said problem status indicating light is connected to an optical coupler.

6. The circuit interrupting device according to claim 4, wherein said normal status indicating light is a green light.

7. The circuit interrupting device according to claim 4, wherein said problem status indicating light is a red light or yellow light.

8. The GFCI according to claim 1, wherein said components of said GFCI comprise a differential transformer, a leakage current detecting integrated circuit chip, a silicon control rectifier, and a solenoid coil.

9. A circuit interrupting device comprising:

a test circuit which automatically generates a simulated leakage current to test components of said circuit interrupting device;

whereby when said circuit interrupting device is powered and said circuit interrupting device is in a tripped state, if all of said components of said circuit interrupting device are working properly, said test circuit allows said circuit interrupting device to be reset;

whereby when said circuit interrupting device is powered and said circuit interrupting device is in a tripped state, if at least one of said components of said circuit interrupting device is not working properly, said test circuit prevents said circuit interrupting device from being reset;

wherein said circuit interrupting device is a around fault circuit interrupter, an arc fault circuit interrupter, an immersion detection circuit interrupter, an appliance leakage circuit interrupter, or a circuit breaker;

wherein said ground fault circuit interrupter comprises:

a housing;

a tripping device positioned in a base of said housing;

a circuit board positioned in said base of said housing; said circuit board comprising a first pair of flexible metal pieces having a first end and a second end;

wherein said first pair of flexible metal pieces is operationally connected to power source input terminals; wherein said first end of each of said first pair of flexible metal pieces is operationally connected to a hot input line or a neutral input line through a differential transformer; wherein said second end of each of said first pair of flexible metal pieces has a movable contact;

a second pair of flexible metal pieces having a first end and a second end;

wherein said first end of each of said second pair of flexible metal pieces is operationally connected to a hot power output terminal or a neutral power output terminal; said second end of each of said second pair of flexible metal pieces having a movable contact;

a pair of output conductors positioned in an insulated middle support; wherein each of said output conductors contains a pair of fixed contacts; and wherein said movable contact of each of said first pair of flexible metal pieces and said movable contact of each of said second pair of flexible metal pieces are capable of connecting/disconnecting to each of said fixed contacts on said pair of output conductors.

10. The circuit interrupting device according to claim 9, wherein said tripping device comprises a tripper, a locking member, a locking spring, a tripping lever, and a solenoid coil.

11. The circuit interrupting device according to claim 10, wherein said ground fault circuit interrupter further comprises a test button; wherein said test button has a tail end which is extended to an end of said tripping lever; and wherein when said test button is depressed, said tail end of said test button presses against said tripping lever, which causes said ground fault circuit interrupter to mechanically trip.

12. The circuit interrupting device according to claim 10, wherein said tripper is positioned underneath a reset button; said tripper having a central through-hole to receive a directional lock which is coupled to said reset button; said directional lock having a blunt end; said directional lock being movable in a vertical direction in said through-hole;

wherein said locking member is L-shaped, containing a horizontal side extending into said tripper and through the through-hole and a vertical side having an inner surface and an outer surface; said horizontal side of said locking member having an opening therein and being movable through said through-hole in a horizontal direction between an aligned position in which the opening of said locking member is aligned with said blunt end of said directional lockand a misaligned position in which the opening is misaligned with said blunt end of said directional lock;

said locking spring being located between a side wall of said tripper and said inner surface of said vertical side of said L-shaped locking member;

said solenoid coil being positioned at said outer surface of said L-shaped locking member; said solenoid coil having an iron core; whereby when said solenoid coil is energized, said iron core moves towards said outer surface of said vertical side of said locking member, thereby moving said locking member into said aligned position; and said tripping lever being connected to a hole at said horizontal side of said L-shaped locking member.

13. The circuit interrupting device according to claim 10, wherein said tripper comprises a pair of lifting arms positioned below each of said movable contacts.

14. The circuit interrupting device according to claim 9, wherein each of said movable contacts of said first pair of said flexible metal pieces is in a different cross-sectional plane from said each of said movable contacts of said second pair of said flexible metal pieces.

15. The circuit interrupting device according to claim 12, wherein a bottom of said tripper is operationally connected to said circuit board through a power source switch containing a movable contact located at said bottom of said tripper and a fixed contact located at said circuit board; whereby when said reset button is depressed, said movable contact is in contact with said fixed contact so as to close said power source switch and when said reset button is released, said movable contact is detached from said fixed contact so as to open said power source switch.

16. The circuit interrupting device according to claim 10, wherein a leakage current detection control integrated circuit chip is connected to said differential transformer; whereby when a fault is detected, said differential transformer sends a signal to said leakage current detection control integrated circuit chip, which in turn sends a signal to a silicon control rectifier (SCR) to trigger said tripping device to interrupt electrical continuity in said circuit interrupting device.

17. The circuit interrupting device according to claim 9, wherein each of said pair of said output conductors comprises a pair of gripping wing pieces protruded to output socket holes at a front lid of said housing.

18. The circuit interrupting device according to claim 9, further comprising a position limiting piece below each of said first and said second pair of flexible metal pieces.

19. The GFCI according to claim 9, wherein said components of said GFCI comprise a differential transformer, a leakage current detecting integrated circuit chip, a silicon control rectifier, and a solenoid coil.

20. A method for detecting an end of life of a circuit interrupting device comprising:

properly connecting said circuit interrupting device to power input terminals;

making sure that said circuit interrupting device is in a tripped position;

observing whether said circuit interrupting device is capable of being reset; whereby when a service life of said circuit interrupting device has not ended, said circuit interrupting device is capable of being reset; and whereby when said service life of said circuit interrupting device has ended, said circuit interrupting device is incapable of being reset.

21. The method according to claim 20, wherein said circuit interrupting device is properly connected to said power input terminals if said circuit interrupting device is not reversed wired or miswired.

22. The method according to claim 20, wherein if said circuit interrupting device is not in said tripped position, depress a test button to manually trip said circuit interrupting device.

23. The method according to claim 20, further comprising:

observing whether a normal status indicating light or a problem status indicating light is turned on;

whereby when said normal status indicating light is turned on, a service life of said circuit interrupting device has not ended; and whereby when said problem status indicating light is turned on, said service life of said circuit interrupting device has ended.

24. The method according to claim 20, wherein said circuit interrupting device is in said tripped state due to a ground fault, a simulated leakage current, mechanical tripping by depressing a test button, or a GFCI manufactured by a factory delivered in said tripped state before being installed.

25. A ground fault circuit interrupter (GFCI) comprising:

a test circuit which automatically generates a simulated leakage current to test components of said GFCI; wherein said components of said GFCI comprise a differential transformer, a leakage current detecting integrated circuit chip, a silicon control rectifier, and a solenoid coil;

whereby when said GFCI is powered and in a tripped state, if all of said components of said GFCI are working properly, said test circuit allows said GFCI to be reset; and whereby when said GFCI is powered and said GFCI is in a tripped state, if at least one of said components of said GFCI is not working properly, said test circuit prevents said GFCI from being reset;

a housing;

a tripping device positioned in said housing;

a circuit board positioned in said housing;

a first pair of flexible metal pieces electrically connected to a hot input line or a neutral input line of power source input terminals through said differential transformer;

a second pair of flexible metal pieces electrically connected to a hot power output line or a neutral power output line of power output terminals; and a pair of output conductors electrically connected to a user accessible load;

wherein each of said first pair of flexible metal pieces and each of said second pair of flexible metal pieces are capable of electrically connecting/disconnecting to each of said pair of output conductors to cause electrical continuity or discontinuity between said power source input terminals, said power output terminals, and said user accessible load.

26. The GFCI according to claim 25, wherein each of said output conductors contains a pair of fixed contacts.

* * * * *